US006882904B1

(12) United States Patent
Petrie et al.

(10) Patent No.: US 6,882,904 B1
(45) Date of Patent: Apr. 19, 2005

(54) COMMUNICATION AND CONTROL NETWORK FOR DISTRIBUTED POWER RESOURCE UNITS

(75) Inventors: Edward M. Petrie, Cary, NC (US); Hans Levander, Baden (CH); H. Lee Willis, Cary, NC (US); Harold M. Stillman, Greenwich, CT (US)

(73) Assignee: ABB Technology AG, Zurich (SE)

( * ) Notice: Subject to any disclaimer, the term of this patent is extended or adjusted under 35 U.S.C. 154(b) by 0 days.

(21) Appl. No.: 10/715,038

(22) Filed: Nov. 17, 2003

Related U.S. Application Data

(63) Continuation of application No. 09/752,574, filed on Dec. 29, 2000, now abandoned.

(51) Int. Cl.[7] .............................................. G06F 19/00
(52) U.S. Cl. ........................ 700/295; 700/286; 700/291
(58) Field of Search ................................. 700/286, 291, 700/295; 705/412

(56) References Cited

U.S. PATENT DOCUMENTS

| | | | |
|---|---|---|---|
| 3,683,161 A | 8/1972 | Stadlin et al. | 235/151.21 |
| 3,719,809 A | 3/1973 | Fink | 235/151.21 |
| 3,913,829 A | 10/1975 | Fink | 235/151.21 |
| 4,264,960 A * | 4/1981 | Gurr | 700/295 |
| 4,527,071 A | 7/1985 | Ausiello | 290/4 |
| 5,237,507 A | 8/1993 | Chasek | 364/464.04 |
| 5,278,772 A | 1/1994 | Knupp | 364/492 |
| 5,323,328 A | 6/1994 | Tanaka | 364/492 |
| 5,404,314 A | 4/1995 | Knupp | 364/493 |
| 5,424,958 A | 6/1995 | Knupp | 364/493 |
| 5,432,710 A * | 7/1995 | Ishimaru et al. | 705/412 |
| 5,436,510 A | 7/1995 | Gilbert | 307/38 |
| 5,517,422 A | 5/1996 | Ilic et al. | 364/492 |
| 5,553,003 A | 9/1996 | Harada et al. | 700/286 |
| 5,598,349 A | 1/1997 | Elliason et al. | 364/492 |
| 5,598,420 A | 1/1997 | Kaufman | 371/20.1 |
| 5,621,654 A | 4/1997 | Cohen et al. | 364/493 |
| 5,664,101 A | 9/1997 | Picache | 395/200 |
| 5,694,329 A | 12/1997 | Pomatto | 364/492 |
| 5,706,207 A | 1/1998 | Kürten et al. | 364/492 |
| 5,754,033 A | 5/1998 | Thomson | 322/45 |
| 5,794,212 A | 8/1998 | Mistr, Jr. | 705/26 |
| 5,805,442 A | 9/1998 | Crater et al. | 364/138 |
| 5,805,458 A | 9/1998 | McNamara et al. | 702/60 |
| 5,818,725 A | 10/1998 | McNamara et al. | 364/483 |
| 5,894,422 A | 4/1999 | Chasek | 364/528.26 |
| 5,896,382 A | 4/1999 | Davis et al. | 370/401 |
| 5,930,779 A | 7/1999 | Knoblock et al. | 705/412 |
| 5,956,487 A | 9/1999 | Venkatraman et al. | 395/200.48 |
| 5,973,696 A | 10/1999 | Agranat et al. | 345/357 |
| 5,974,403 A | 10/1999 | Takriti et al. | 705/412 |
| 6,021,402 A | 2/2000 | Takriti | 705/412 |
| 6,047,274 A | 4/2000 | Johnson et al. | 705/412 |
| 6,055,163 A * | 4/2000 | Wagner et al. | 363/37 |
| 6,061,603 A | 5/2000 | Papadopoulos et al. | 700/83 |
| 6,084,318 A * | 7/2000 | Mardirossian | 307/72 |

(Continued)

FOREIGN PATENT DOCUMENTS

| | | | | |
|---|---|---|---|---|
| JP | 2002186182 | * | 12/2000 | H02J/3/00 |
| JP | 02004088898 | * | 8/2002 | H02J/3/00 |

OTHER PUBLICATIONS

"The use of induction generators for small–scale hydroelectric schemes in remote areas", Georgios Manoli Demetriades, Mediterranean Electrotecnical Conference, 2000.*

Brain Power™, ABB, "Focus on Transmission and Distribution", *ABB Review, The Corporate Technical Journal of the ABB Group*, 2000, 3, 1–75.

Primary Examiner—Leo Picard
Assistant Examiner—Michael D. Masinick
(74) Attorney, Agent, or Firm—Woodcock Washburn LLP

(57) ABSTRACT

Methods and systems are disclosed for managing a plurality of power resource assets from a central control center, operating the plurality of power resource assets in an automated fashion as a single power plant.

14 Claims, 7 Drawing Sheets

U.S. PATENT DOCUMENTS

| | | | |
|---|---|---|---|
| 6,088,659 A | 7/2000 | Kelley et al. | 702/62 |
| 6,104,967 A | 8/2000 | Hagen et al. | 700/293 |
| 6,111,735 A | 8/2000 | Nelson et al. | 361/64 |
| 6,112,246 A | 8/2000 | Horbal et al. | 709/230 |
| 6,255,805 B1 * | 7/2001 | Papalia et al. | 323/207 |
| 6,311,105 B1 * | 10/2001 | Budike, Jr. | 700/291 |
| 6,512,966 B1 * | 1/2003 | Lof et al. | 700/291 |
| 6,519,509 B1 * | 2/2003 | Nierlich et al. | 700/286 |
| 2002/0128749 A1 | 9/2002 | Arita et al. | 700/286 |
| 2004/0024494 A1 * | 2/2004 | Bayoumi et al. | 700/286 |
| 2004/0027004 A1 * | 2/2004 | Bayoumi et al. | 307/43 |
| 2004/0030457 A1 * | 2/2004 | Bayoumi et al. | 700/286 |
| 2004/0111226 A1 * | 6/2004 | Brewster et al. | 702/61 |

* cited by examiner

FIG. 1
Prior Art
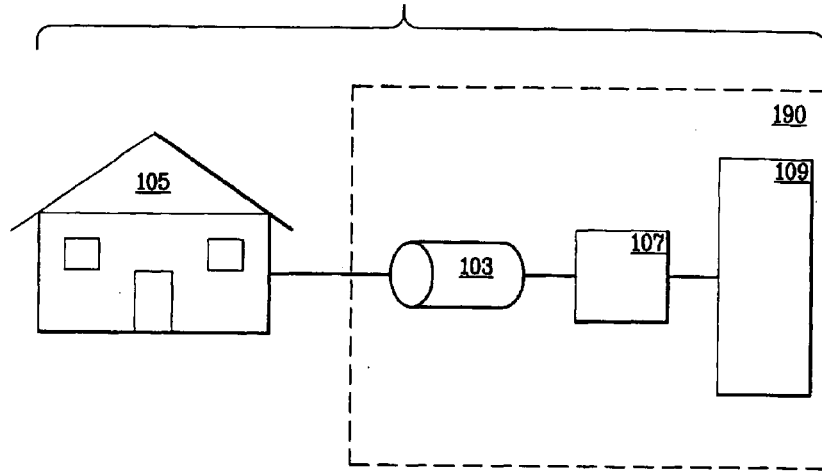
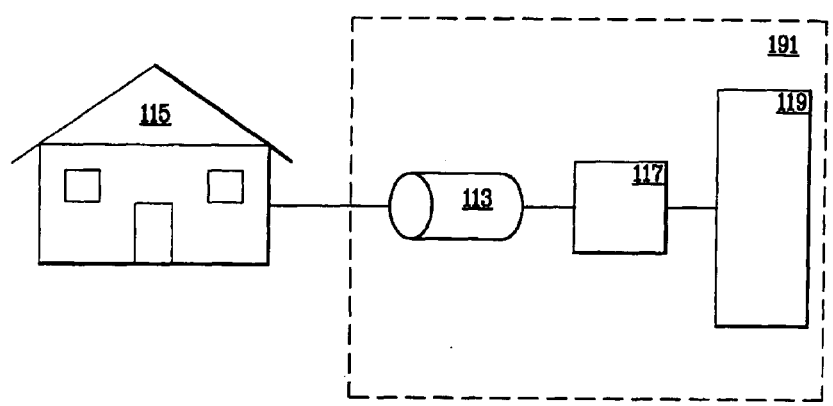

COMMUNICATION AND CONTROL NETWORK FOR DISTRIBUTED POWER RESOURCE UNITS

This application is a continuation of Ser. No. 09/752,574 filed Dec. 29, 2000, now abandoned, the entirety of which is incorporated herein by reference.

TECHNICAL FIELD

This invention relates to the field of communications and control. In particular, the invention is directed to the management of distributed power resource systems through an automated communications and control system.

BACKGROUND OF THE INVENTION

As computing was done in the 1960's with powerful, central computers connected to remote terminals, so traditionally electrical power has been produced by large centralized power stations that generate electricity and transmit the electricity over high-voltage transmission lies. The voltage is then stepped-down in several stages and distributed to the customer. But just as the mainframes of the 1960's were superseded by the desktop PC, and then by networked computers and Web-based information systems, so electrical power distribution systems are evolving. This evolution is a result of drawbacks in the generation of power by large centralized power stations, of changes in the regulation of the electrical industry and of technological advances in the development of different types of small power generators and storage devices.

The bulk of today's electric power comes from central power plants, most of which use large, fossil-fired combination or nuclear boilers to produce steam that drives steam turbine generators. There are numerous disadvantages to these traditional power plants.

Most of these plants have outputs of more than 100 megawatts (MW), making them not only physically large but also complex in terms of the facilities they require. Site selection and procurement are often a real challenge because of this. Ofen no sites are available in the area in which the plant is needed, or ordinances are in effect (such as no high voltage power lines are permitted in certain areas) that make acquisition of an appropriate site difficult.

There is considerable public resistance on aesthetic, health and safety grounds, to building more large centralized power plants, especially nuclear and traditional fossil-fueled plants. High voltage transmission lines are very unpopular. People object to the building of large power plants on environmental grounds as well. Long-distance electricity transmission via high voltage power lines has considerable environmental impact.

Long distance transmission of electricity is expensive, representing a major cost to the end-user because of investment required in the infrastructure and because losses accrue in the long-distance transmission of electricity proportionate to the distance traveled so that additional electricity must be generated over that needed to handle the power needs of the area.

Plant efficiency of older, existing large power plants is low. The plant efficiency of large central generation units can be in the 28–35% range, depending on the age of the plant. This means that the plant converts only between 28–35% of the energy in their fuel into useful electric power. To exacerbate the matter, typical large central plants must be over-designed to allow for future capacity, and consequently these large central plants run for most of their life in a very inefficient manner.

In areas where demand has expanded beyond the capacity of large power plants, upgrading of existing power plants may be required if the plant is to provide the needed additional power. This is often an expensive and inefficient process.

Some areas are too remote to receive electricity from existing transmission lines, requiring extension of existing transmission lines, resulting in a corresponding increased cost for electric power.

In part due to concerns regarding centralized power production, the enactment of the Public Utility Regulatory Policies Act of 1978 (PURPA) encouraged the commercial use of decentralized, small-scale power production. PURPA's primary objective was to encourage improvements in energy efficiency through the expanded use of cogeneration and by creating a market for electricity produced from unconventional sources. The 1992 Federal Energy Policy Act served to enhance competition in the electric energy sector by providing open access to the Unites States' electricity transmission network, called the "grid."

Distributed power generation and storage could provide an alternative to the way utilities and consumers supply electricity which would enable electricity providers to minimize investment, improve reliability and efficiency, and lower costs. Distributed resources can enable the placement of energy generation and storage as close to the point of consumption as possible, with increased conversion efficiency and decreased environmental impact. Small plants can be installed quickly and built close to where the electric demand is greatest. In many cases, no additional transmission lines are needed. A distributed generation unit does not carry a high transmission and distribution cost burden because it can be sited close to where electricity is used, resulting in savings to the end-user.

New technologies concerning small-scale power generators and storage units also have been a force contributing to an impetus for change in the electrical power industry. A market for distributed power generation is developing. The Distributed Power Coalition of America estimates that small-scale projects could capture twenty percent of new generating capacity (35 Gigawatts) in the next twenty years.

Distributed generation is any small-scale power generation technology that provides electric power at a site closer to customers than central station generation. The small-scale power generators may be interconnected to the distribution system (the grid) or may be connected directly to a customer's facilities. Technologies include gas turbines, photovoltaics, wind turbines, engine generators and fuel cells. These small (5 to 1,500 kilowatt) generators are now at the early commercial or field prototype stage. In addition to distributed generation, distributed resources include distributed storage systems such as the storage of energy by small-scale energy storage devices including batteries, super-conducting magnetic energy storage (SMES), and flywheels.

Efficiency of power production of the new small generators is far better than traditional existing power plants. In contrast to the 28–35% efficiency rate of older, centralized large power plants, efficiencies of 40 to 50% are attributed to small fuel cells and to various new gas turbines and combined cycle units suitable for distributed generation applications. For certain novel technologies, such as a fuel cell/gas turbine hybrid, electrical efficiencies of about 70% are claimed. Cogeneration, providing both electricity and heat or cooling at the same time, improves the overall efficiency of the installation even further, up to 90%.

Project sponsors benefit by being able to use electric power generated by distributed resources to avoid high demand charges during peak periods and gain opportunities to profit from selling excess power to the grid. Utilities gain reliability benefits from the additional capacity generated by the distributed resources, and end-users are not burdened with the capital costs of additional generation. In some cases, electricity generated by distributed resources is less costly than electricity from a large centralized power plant.

Distributed power generation and storage could provide an alternative to the way end-users receive electricity which would enable electricity providers to minimize investment, improve reliability and efficiency, and lower costs. Distributed resources can enable the placement of energy generation and storage as close to the point of consumption as possible, with increased conversion efficiency and decreased environmental impact. Distributed power generation can also be used to supplement the existing grid, thereby improving power reliability.

Distributed generation and storage has been accompanied, however, by distributed management. The value of these new technologies could be greatly increased if it were possible to connect the small generators and storage systems together and manage them as a unit. To date, however, it has not been possible to connect the different elements of the distributed system together to accomplish this.

SUMMARY OF THE INVENTION

The disclosed invention, a communications and control management system for electric power assets (generators and storage devices) satisfies the aforementioned need in the art by disclosing a micro-grid including multiple distributed resource assets (e.g. distributed generation and storage) connected by a communications network to a central management and control center so that the operation of the assets can be coordinated and the aggregate of assets can be operated as a single plant. The management and control center receives operation and performance data from a plurality of electric power devices, and data concerning current electric power requirements and manages the operation of the electric power devices to optimize the operation of the electric power assets.

The micro-grid may be connected to a conventional electric distribution grid, or it could operate independently as a stand-alone (islanded) system disconnected from the conventional grid. The disclosed invention connects multiple, potentially broadly dispersed, single destributed generation sites or distributed generation clusters, (several distributed generators at a particular site), into an intelligent optimized system that operates as an automated single power plant capable of producing the aggregated load of the individual component power generators and storage units.

BRIEF DESCRIPTION OF THE DRAWING

The present invention is further described in the detailed description that follows, by reference to the noted plurality of drawings by way of non-limiting examples of preferred embodiments of the present invention, in which like reference numerals represent similar parts throughout the several views of the drawings, and wherein:

FIG. 1 is a block diagram of a distributed power generation system, as is well known in the art;

DETAILED DESCRIPTION OF THE PREFERRED EMBODIMENTS

Overview

Figure 2:
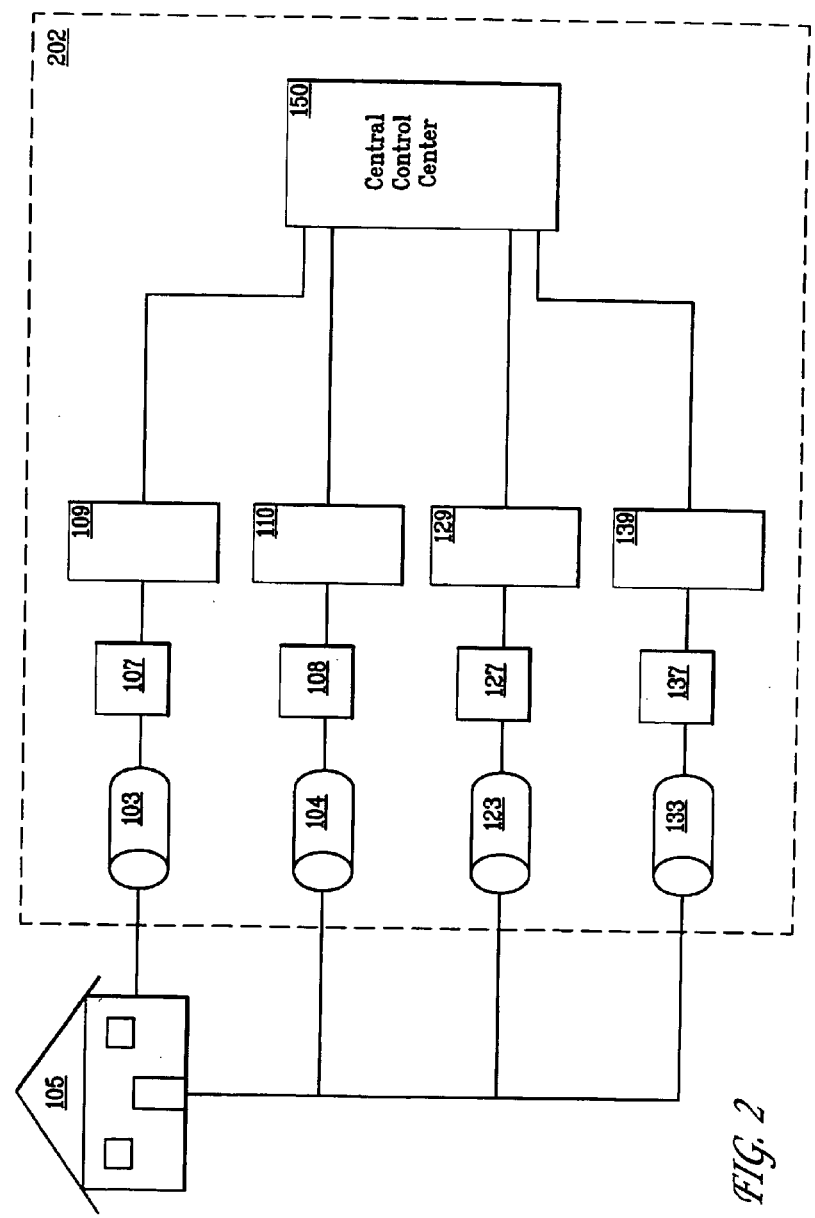
FIG. 2 is a block diagram of a distributed power resource management system including one power station in accordance with the invention.

As can be seen from FIG. 1, distributed generation is any small-scale power generation technology 103, 113 that provides electric power at a site closer to customers' premises 105, 115 than central station generation. The small-scale power generators 103, 113 may be interconnected to the distribution system, "the grid" (not shown) or may be connected directly to a customer's premise or facility, 105, 115. To control a distributed generator 103, 113, distributed generator 103, 113 is connected to a controller 107, 117 that is connected to a communications device 109, 119. Communications device 109, 119, (for example, a modem), and controller 107, 117, (for example, a conventional programmable logic controller (PLC)) are well known in the art.

As can be seen from FIG. 1, distributed generator 103 cannot be used to provide electricity to customer premise 115 and distributed generator 113 cannot be used to provide electricity to customer premise 105. Likewise controller 107 cannot control distributed generator 113 and controller 117 cannot control distributed generator 103.

If customer premise 105 requires an additional 10 kilowatts (kW) of power than a serving power plant (not shown) can produce and distribute through the grid (not shown), use of a distributed system 190 consisting of, for example, fuel cell 103 that can supply an additional 12 kW of power, would eliminate the necessity of having to build a new power plant with a higher peak power output ability. Although this is clearly a desirable result, and a substantial savings would be realized, 2 kW of power would be wasted because the additional 2 kW power output by fuel cell 103 would be unused.

If, however, customer premise 105 requires an additional 10 kW of power than a serving power plant (not shown) can produce and distribute through the grid (not shown), and distributed resource 103 could produce only 5 kW of power, distributed resource 113 would not be able to supply power to customer premise 105.

Operating a Group of Distributed Resources as a Single Power Plant

Advantages to both the end-user of electricity and to the grid operator or utility owner could accrue if a distributed resource system including a plurality of small-scale power generators and storage units could be operated as a unit. The disclosed invention is directed to providing an automatic centralized management and control system which can manage and control a plurality of electrical power stations as a single power plant.

Control can be automated at several levels. For example, at the generator itself, control intelligence can be embedded within the controller to perform automated functions (for example, to have an emergency generator start when utility power is disrupted.) At a site level, controls could automate several generation devices (for example, to optimize electric and thermal output.) At an aggregate level, control can be used for peak-shaving or to start all generators when there is a regional power disruption. The communications ability also provides the operator the ability to change control set points, introduce new dispatching logic, or to operate the assets in a totally manual function.

FIG. 2 illustrates a remotely managed distributed resource management and control system including power station 202. Power station 202 includes distributed resources 103, 104, 123 and 133, and controllers 107, 108, 127 and 137 and communications devices 109, 110, 129 and 139. In an exemplary embodiment, distributed resource 103 may produce 6 MW of power when resource 103 runs in its most efficient and optimal condition, distributed resource 123 may produce 4 MW of power when resource 123 runs in its most efficient and optimal condition, and distributed resource 133 may produce 5 MW of power when resource 133 ms in its most efficient and optimal condition. Power station 202 is coupled to consumer premise 105.

It can be seen from FIG. 2, that distributed generator 103 is connected to controller 107 which is connected to communications device 109 that is in communication with central control center 150. Likewise, distributed generator 123 is connected to controller 127 that is connected to communications device 129 that is in communication with central control center 150. Distributed generator 133 is connected to controller 137 that is connected to communications device 139 that is in communication with central control center 150. Distributed storage unit 104 is connected to controller 108 that is connected to communications device 110 that is in communication with central control center 150.

Distributed generators 103, 123 and 133 include, but are not limited to, gas turbines, photovoltaics, wind turbines, engine generators, fuel cells, and supplementary power received from the grid. Distributed generators include small-scale power generation units that produce a few kilowatts (kW) to 10 megawatts (MW) of power, however the disclosed invention includes within its scope, control and management of units producing power outside this range.

In addition to distributed generation, distributed resources include distributed storage units 104. Distributed storage units include but are not limited to batteries, superconducting magnetic energy storage (SMES), and flywheels. Distributed storage units include small-scale power storage units that produce a few kilowatts (kW) to 10 MW of power and store that power from seconds to hours. However, the disclosed invention includes within its scope, control and management of units producing and storing power outside this range.

Distributed resources as controlled by central control center 150 can provide energy for any combination of, and not limited to, the following: baseload, peak shaving, backup, power quality and grid support.

Communications devices 109, 110, 129 and 139 are well-known in the art, an exemplary communications device being a modem. A modem is a device used for converting digital signals into analog signals and for converting analog signals into digital signals. A modem is used for transmission of data over communications channels. It should be noted that any appropriate device for transmission of data over a communications system may be used without departing from the spirit and scope of the invention.

Controller 107, 108, 127 and 137 are commonly known controllers that control the operation of distributed resources. Such controllers can be represented by conventional logic controllers (PLCs).

Central control center 150 can include any of a variety of computing devices well known in the art. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Central control center 150 controls and manages distributed resources including distributed generators 103, 123 and 133 and distributed storage unit 104. Central control center 150 receives information from distributed generators 103, 123 and 133 and distributed storage unit 104 via communications devices 109, 110, 129 and 139. Central control center 150 also receives information concerning current power needs of customer premise 105. Central control center 150 manages and optimizes the operation of distributed generators 103, 123 and 133 and distributed storage unit 104 to produce the required amount of power in the most efficient and cost-effective way or to optimize the operation in some other way, such as, but not limited to, maximizing reliability, maximizing power quality, and/or minimizing cost.

For example, if customer premise 105 currently requires 10 MW of power in addition to the power customer premise 105 currently receives, and power resources 103, 104, 123 and 133 are currently not producing power, central control center 150 may turn on a combination of units 103, 104, 123 and 133 so that the required additional 10 MW of power required is produced. In this example, central control center 150 may turn on distributed resources 103, producing 6 MW of power in its optimal run condition and distributed resource 123, producing 4 MW of power in its optimal run condition, the aggregate load carried by resources 103 and 123 generating the additional 10 MW of power required by customer premise 105. It should be understood that although it is unlikely that a single customer premise would require 10 MW of power, numerical figures are presented for exemplary purposes only. It should also be understood that customer premise 105 may represent entities including, but not limited to, factories or commercial establishments, whose power needs may be greater than the power needs of a typical residence. It should also be understood that customer premise 105 may represent a number of customer premises whose aggregate needs may run into megawatts of power.

Figure 3:
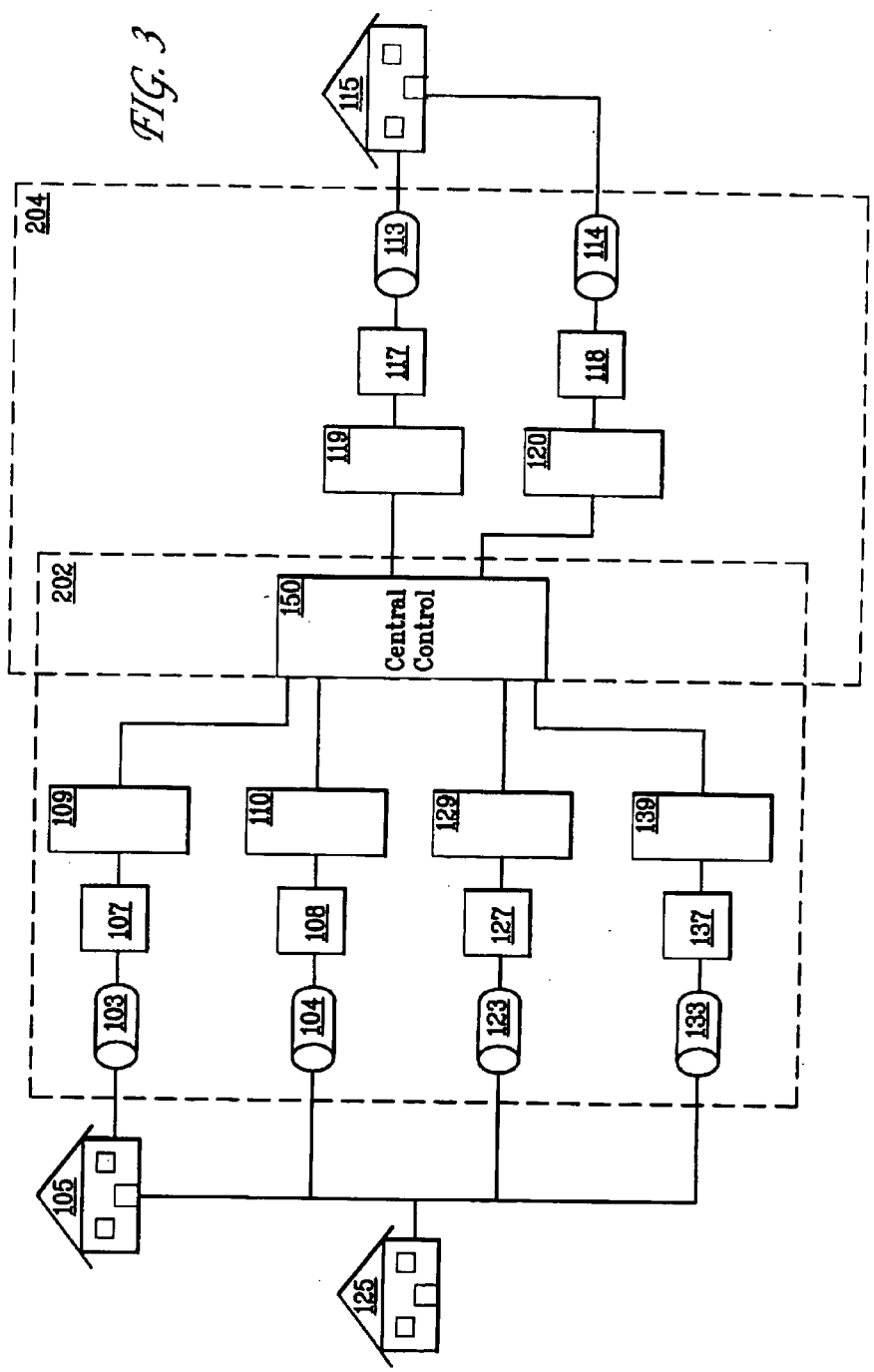
FIG. 3 is a block diagram of a distributed power resource management system including a plurality of power stations in accordance with the invention.

FIG. 3 illustrates a remotely managed distributed resource management and control system including power station 202 and 204. Power station 202 includes distributed resources 103, 104, 123 and 133, controllers 107, 108, 127 and 137 and communications devices 109, 110, 129 and 139. Power station 202 is coupled to customer premises 105 and 125.

Power station 204 includes distributed resources 113 and 114, controllers 117 and 118, and communication devices 119 and 120. Power station 204 is coupled to consumer premise 15. It can be seen from FIG. 3, that distributed generator 103 is connected to controller 107 which is connected to communications device 109 that is in communication with central control center 150. Distributed storage device 104 is connected to controller 108 which is connected to communications device 110 that is in communication with central control center 150. Distributed generator 123 is connected to controller 127 which is connected to communications device 129 that is in communication with central control center 150. Distributed generator 133 is connected to controller 137 which is connected to communications device 139 that is in communication with central control center 150. Likewise, distributed generator 1113 is connected to controller 117 which is connected to communications device 119 that is in communication with central control center 150. In addition, distributed storage device 114 also is connected to controller 118 which is connected to communications device 120 that is in communication with central control center 150.

Communications devices 109, 110, 119, 120, 129 and 139 are well-known in the art, an exemplary communications device being a modem. A modem is a device used for converting digital signals into analog signals and for converting analog signals into digital signals. A modem is used for transmission of data over communications channels. It should be noted that any appropriate device for transmission of data over communications may be used without departing from the spirit and scope of the invention.

Controllers 107, 108, 117, 118, 127 and 137 are commonly known controllers that control the operation of distributed resources.

Central control center 150 controls and manages distributed resources including distributed generators 103, 113, 123 and 133 and distributed storage units 104 and 114. Central control center 150 receives information from distributed generators 103, 113, 123 and 133 and distributed storage units 104 and 114 via controller 107, 117, 127, 137, 108, and 18 respectively, through communications device 109, 119, 129, 139, 110 and 120. Central control center 150 manages and optimizes the operation of distributed generators 103, 113, 123 and 133 and distributed storage units 104 and 114. Central control center 150 receives data concerning current power requirements of consumer premises 105, 115 and 125. Central control center 150 also receives data concerning the operating state of power resources 103, 104, 113, 114, 123 and 133. Central control center 150 operates power resources 103, 104, 113, 114, 123 and 133 to maximize efficiency and minimize the cost of power production by operating the aggregated resources 103, 104, 113, 114, 123 and 133 as a single power plant capable of producing the aggregated load equal to the sum of the power output capabilities of each of power resources 103, 104, 113, 114, 123 and 133.

Thus, any distributed resource 103, 104, 113, 114, 123 and 133 can provide power to any consumer premise 105, 115 and 125 in the system. It should be understood that for this to occur, all premises must be electrically connected either through a utility distribution grid or through a grid specifically installed for distributed power resources, or through any other suitable grid. Assuming that such electrical connection exists, in an exemplary embodiment, for example, distributed generator 103 can provide electricity to customer premise 115 and distributed generator 113 can provide electricity to customer premise 105. Likewise, distributed storage unit 104 and distributed generator 133 can provide electricity to customer premise 115 and distributed generators 113 can provide electricity to customer premise 125 and so on. Central control center 150 controls and manages all distributed resources 103, 104, 113, 114, 123 and 133 so that the performance of all resources 103, 104, 113, 114, 123 and 133 is optimized. By optimization is meant, for example, to provide the highest quality of power output from resources 103, 104, 113, 114, 123 and 133 and/or to minimize cost of power produced by resources 103, 104, 113, 114, 123 and 133, and/or to maximize reliability of power and/or to maximize quality of power and/or to achieve some other objective or objectives. It should be understood that in the example an enumerated quantity of distributed resources are denoted for exemplary purposes only. Any number of customer premises, distributed resources, controller and communications devices may be specified without departing from the spirit and scope of the invention.

Central control center 150 can include any of a variety of computing devices well known in the art. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
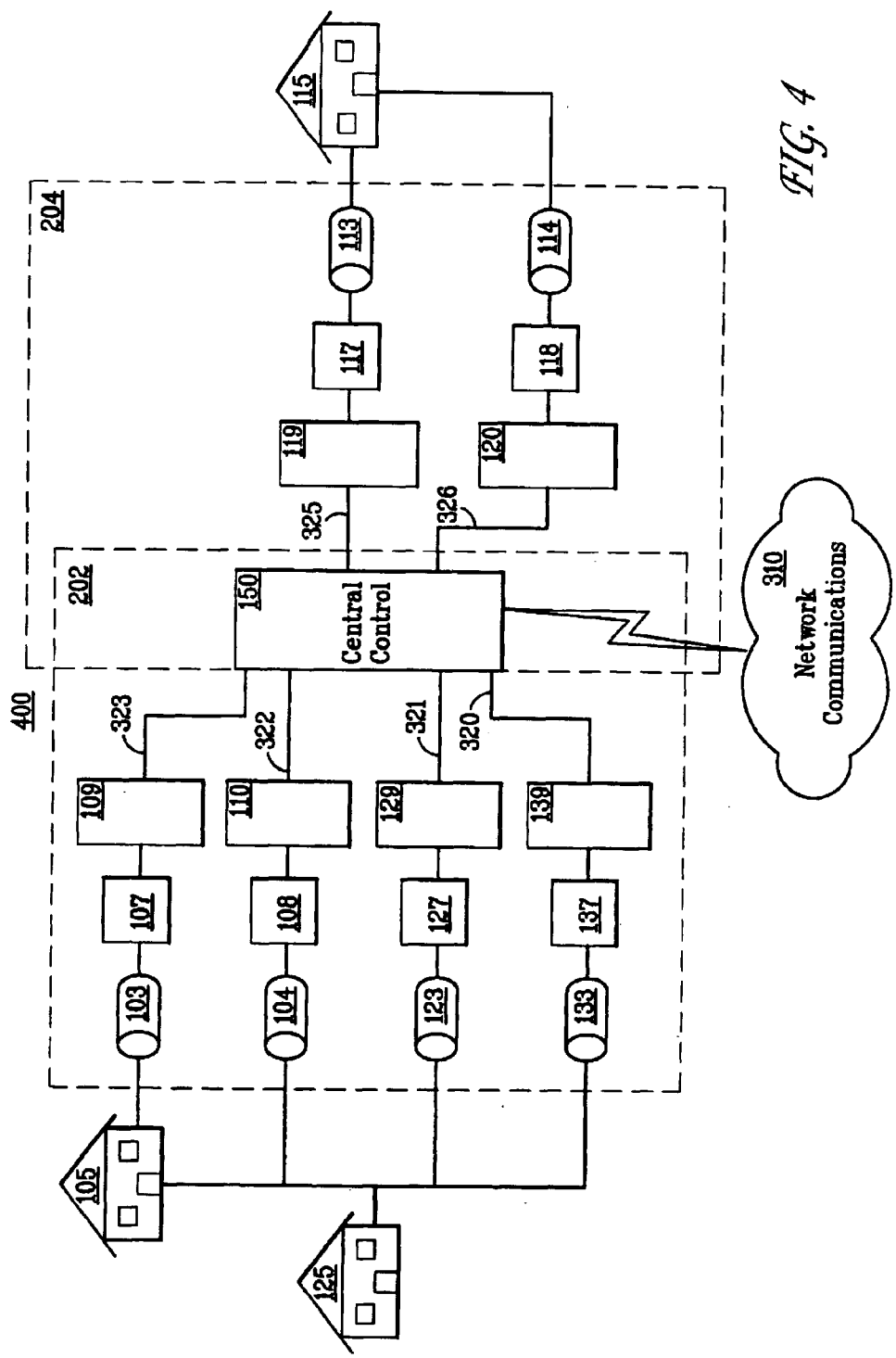
FIG. 4 is a block diagram of a distributed power resource management system implemented on the Internet in accordance with the invention.

Referring now to FIG. 4 a remotely managed electrical energy production and storage system 400 in accordance with the present invention is illustrated. System 400 is in communication with a communications system such as, but not limited to, the World Wide Web. System 400 includes a plurality of power generating stations 202 and 204, each station 202 and 204 including at least one electrical power resource. For example station 202 may include distributed resources 103, 104, 123 and 133 while station 204 may include distributed resources 113 and 114. Each electrical power resource 103, 104, 123 and 133 in an exemplary embodiment is situated in a location that is proximate to consumer premises 105 and 125. Each electrical power resource 113 and 114 in an exemplary embodiment is situated in a location that is proximate to consumer premise 115.

It can be seen that each of the electrical power stations 202 and 204 is in communication with central control center 150 via communications network 310. It should be understood that by "central" it is meant that central control center 150 operates as the controlling feature, not that central control center 150 is physically located in the center of power stations 202 and 204. An example of communications network 310 may be the World Wide Web but any other suitable communications network may be employed without departing from the spirit and scope of the invention. Each electrical power station 202 and 204 can include a single power generator, as illustrated in power station 204 or a plurality of power generators, as illustrated in power station 202. An electric power station 204 can include a single energy storage unit 114 or a plurality of storage units (not shown). An electric power station (not shown) may include no power storage units. Power stations 202 and 204 may be distributed over a geographical region or located in one area.

Communications link 320, 321, 322, 323, 324, 325 and 326 may be implemented via a hard-wired telephone line or a wireless telephone system or a combination thereof. Power stations 202 and 204 may be connected to the conventional grid (not shown) or may operate independently.

Power stations 202 and 204 may include, but are not limited to including, any of the following distributed resources: cogeneration, providing both electricity and heat or cooling at the same time, wind turbines, microturbines, fuel cells, photovoltaic units, and supplementary energy from the national transmission grid (not shown). Many consumer premises 105, 125 and 115 at many locations may be served, as if in one centralized system.

In accordance with the present invention, power station 202 includes a plurality of electric power resources, 103, 104, 123 and 133. In accordance with the invention, if customer premise 105 requires an additional 10 MW of power than a serving power plant (not shown) can produce and distribute through the grid (not shown), central control center 150 operates power stations 202 and 204 in order to optimize power production. In an exemplary embodiment, electric power station 202 includes a 4 MW fuel cell 103, a 6 MW fuel cell 123 and a 5 MW fuel cell 133 operating as a single power plant. Central control center 150 may turn on 4 MW fuel cell 103 and 6 MW fuel cell 123 in order to produce the amount of power required by consumer premise 105. Although particular electric power generation values have been assigned for purposes of illustration in this example, it should be understood that the scope of the invention is not limited to any particular number of electric resource units or amount of electric power produced or stored. In this example the need to build a new power plant would still be avoided but additionally 2 MW of power would not be wasted.

As another example, the power-producing ability of emergency generators could be used in an optimal way. Typically, the operation of emergency generators is often limited by EPA Emission Control regulations to run for, as an example, about 150 hours/year (depending on regional regulations). Operating a system of distributed resources as a single power plant enables an owner of emergency generators to run the emergency generators at a time when a favored price for electricity would be received if the power produced by emergency generators were sold to the grid (not shown) or when receiving additional power from the grid would be particularly costly.

Hence, it can be seen that the disclosed invention includes a microgrid producing in the order of several megawatts of aggregated generation, combined heat and power plants, distribution, protection, control, metering, and all ancillary products and services operating in an automated fashion as a single power plant. It should be understood that enabling technologies well known in the art such as inverters for DC (direct current) generation sources such as for example, fuel cells, interfaces for energy storage devices such as batteries and flywheels, static switchgear, microprocessor based sensors and control, interfaces with higher level controls, on-board diagnostics and monitoring, automated utility interface for dispatching, low voltage transfer switches, and breakers, communication between resource system and end-user, remote dispatching, automated dispatching based on real time cost information, and remote, automated metering may be employed as needed.

As shown in FIG. 4, separate power stations 202 and 204 can be connected together like building blocks to create a system 400 of distributed resources that can be run as if it were a single power plant with the total aggregate load of the power system being the sum of the loads of the individual distributed resources 103, 104, 113, 114, 123 and 133.

Different power sources can be linked together in the power station system, including but not limited to the following: cogeneration, providing both electricity and heat or cooling at the same time, wind turbines, which are becoming increasingly viable following dramatic reductions in cost and significant break-throughs in performance and reliability, microturbines, that are expected to offer low-cost, cleaner power in the 25–500 kW range within the next few years; fuel cells that are expected to provide clean, competitive power in the 2–300 kW range; photovoltaic technologies, that are able to convert sunlight directly to electricity from 2–300 kW and supplementary energy from the national transmission grid. The disclosed invention can link these distributed resources together and operate them independently (delivering the power directly to a community or user) or attach the microgrid to the conventional grid.

A number of potential benefits for the end-users of the disclosed invention are possible. For example, in the case of the microgrid unconnected to the conventional transmission grid, the disclosed invention may lead to reduced energy and demand bills because instead of operating an existing power plant at a unoptimized and therefore inefficient level, distributed resources operating at higher efficiency rates could be employed. Additional advantages may include enhanced "energy management" and flexibility, and increased reliability (instead of relying on one distributed resource, a plurality of distributed resources could be used).

Referring again to FIG. 4, it can be seen that distributed resource stations 202 and 204 located in proximity to customer premises 105, 115 and 125, distributed over a given geographical area, are in communication with central control center 150 via communications network 310. Central control center 150 monitors and dispatches power generation and storage stations 103, 104, 113, 114, 123, 133. Hence power stations 202 and 204 can be operated as a single body of power generation. For example, central control center could schedule combined output of stations 202 and 204 to any required level from 0 kW to the total aggregate load of power resources 103, 104, 113, 114, 123, 133 by turning on and ramping up various combinations of units 103, 104, 113, 114, 123, 133. Each electrical power resource 103, 104, 113, 114, 123, 133 can be managed and controlled by central control center 150 to maximize the power quality and availability that might be demanded by customer premises 105, 115 and 125.

Figure 5:
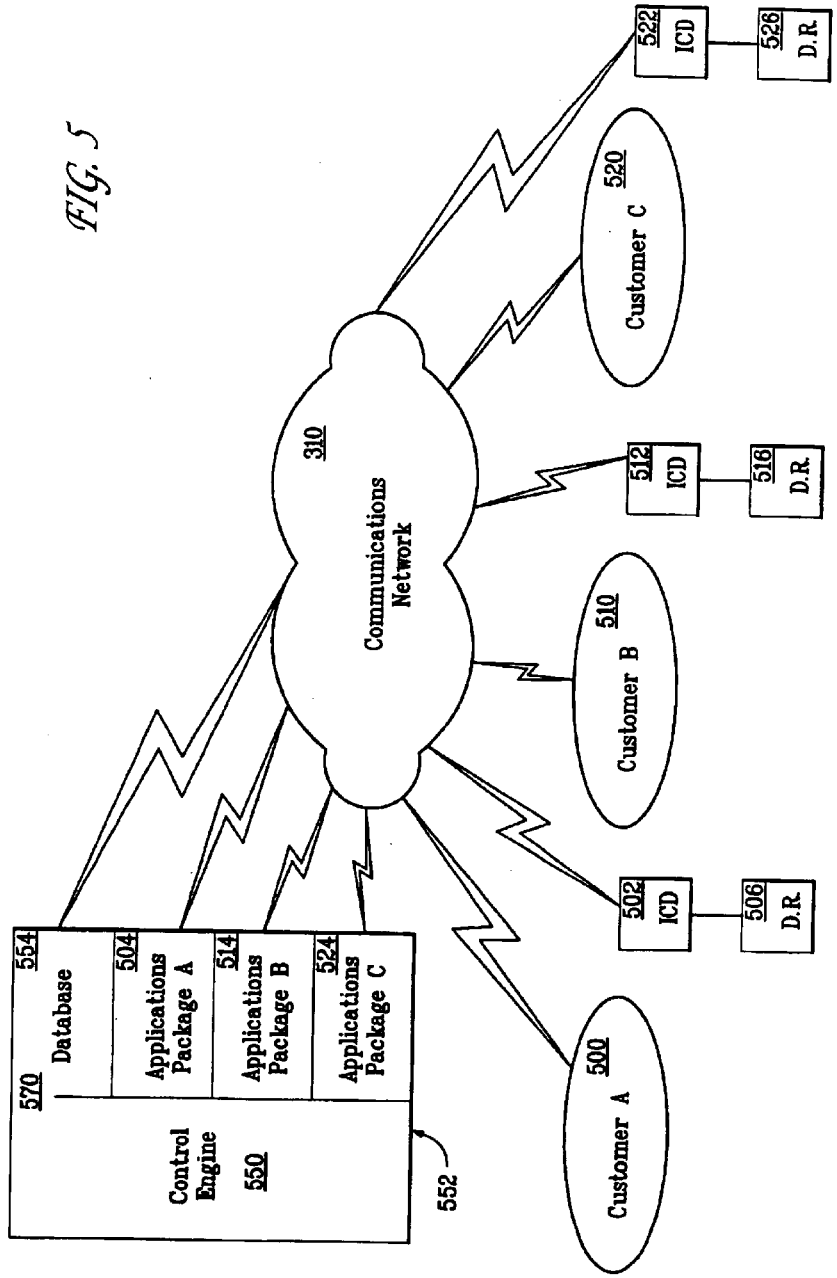
FIG. 5 is a block diagram of the management system illustrating the interconnection between the management system and a plurality of clients in accordance with the invention.

FIG. 5 is a block diagram of the distributed resource management system in accordance with the present invention. As shown in FIG. 5, an automated service bureau 570 is provided that allows clients to monitor and control various distributed resources 506, 516 and 526. As discussed above, the resources include but are not limited to distributed generation and distributed storage units. Service bureau 570 maintains database 554 on server 552. Service bureau 570 also specifies communications protocols and interconnection devices 502, 512, 522 and provides and maintains control, monitoring and applications software 504, 514 and 524 for clients 500, 510 and 520. A fee may be charged, based on elapsed time, connect time, data points or based on other criteria. Communications are established through the World Wide Web or the like.

Referring to FIG. 5, it can be seen that client 500 can monitor and control distributed devices 506 through application package 504, client 510 can monitor and control distributed devices 516 through application package 514 and client 520 can monitor and control distributed devices 526 through application package 524. Applications packages 504, 514 and 524 run on top of control engine 550. Control engine 550 and database 554 is resident on server 552. It should be understood that although database 554 is represented as a single database, a plurality of databases may be implemented without departing from the spirit and scope of the invention. For example, a database may exist for Customer A 500, a separate database for Customer B 510 may exist and a separate database for Customer C 520 may exist. Server 552 is in communication with a communications network 310 such as, but not limited to, the World Wide Web.

Monitoring and control data from distributed resource 506, 516, 526 is received by distributed interconnection devices (ICD) 502, 512, and 522. Interconnection devices 502, 512 and 522 in a preferred embodiment are modems or controllers such as are well known in the art but it should be understood that other appropriate devices may be used without departing from the scope and spirit of the invention. Interconnection devices 502, 512, and 522 transmit data received from distributed resources 506, 516 and 526 through telecommunications network 310 to server 552. Interconnection devices 502, 512 and 522 transmit data from distributed resources 506, 516 and 526 in a format compatible with the format of database 554.

Database 554 is updated with data received from interconnection devices 502, 512 and 522. Control engine 550 organizes and optimizes data from database 554. Applications packages 504, 514 and 524 on server 552 are in communication with control engine 550 on server 552. It should be understood that although in the example, applications packages 504, 514 and 524, control engine 550 and database 554 are on server 552, applications packages 504, 514 and 524, control engine 550 and database 554 could be located elsewhere without departing from the spirit and scope of the invention. For example, applications packages 504, 514 and 524, control engine 550 and database 554 could be placed on client's computer 500. Applications packages 504, 514 and 524 are customizable to adapt to the individual needs of clients. Applications packages 504, 514 and 524 may include software or computer-executable instructions.

Database 554 is adapted to receiving data from interconnection devices 502, 512 and 522. Similarly interconnection devices 502, 512 and 522 can receive data from database 554 or from applications packages 504, 514 and 524 respectively in order to manage distributed resources 506, 516 and 526 to optimize operation of distributed resources 506, 516 and 516, as previously discussed.

Illustrative Computing Environment

Figure 6:
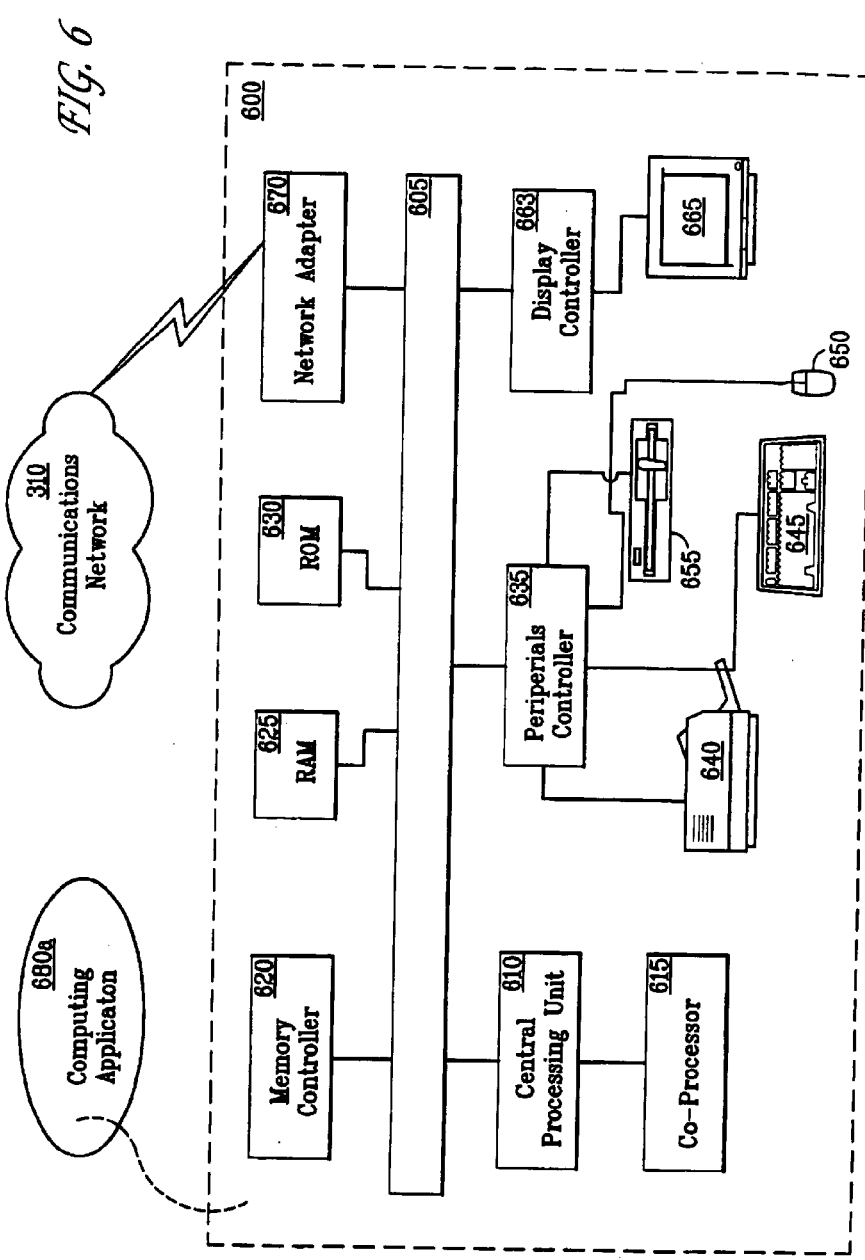
FIG. 6 illustrates an exemplary computing system in accordance with the invention.

FIG. 6 depicts an exemplary computing system 600 in accordance with the invention. Computing system 600 executes an exemplary computing application 80a capable of controlling and managing a group of distributed resources so that the management of distributed resources is optimized in accordance with the invention. Exemplary computing system 600 is controlled primarily by computer-readable instructions, which may be in the form of software, wherever, or by whatever means such software is stored or accessed. Such software may be executed within central processing unit (CPU) 610 to cause data processing system 600 to do work. In many known workstations and personal computers central processing unit 610 is implemented by a single-chip CPU called a microprocessor. Coprocessor 615 is an optional processor, distinct from main CPU 610, that performs additional functions or assists CPU 610. One common type of coprocessor is the floating-point coprocessor, also called a numeric or math coprocessor, which is designed to perform numeric calculations faster and better than general-purpose CPU 610. Recently, however, the functions of many coprocessors have been incorporated into more powerful single-chip microprocessors.

In operation, CPU 610 fetches, decodes, and executes instructions, and transfers information to and from other resources via the computer's main data-transfer path, system bus 605. Such a system bus connects the components in computing system 600 and defines the medium for data exchange. System bus 605 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 610. Devices that attach to these busses and arbitrate to take over the bus are called bu masters. Bus master support also allows multiprocessor configurations of the busses to be created by the addition of bus master adapters containing a processor and its support chips.

Memory devices coupled to system bus 605 include random access memory (RAM) 625 and read only memory (ROM) 630. Such memories include circuitry that allow information to be stored and retrieved. ROMs 630 generally contain stored data that cannot be modified. Data stored in RAM 625 can be read or changed by CPU 610 or other hardware devices. Access to RAM 625 and/or ROM 630 may be controlled by memory controller 620. Memory controller 620 may provide an address translation function that translates virtual addresses into physical addresses as instructions are executed. Memory controller 620 also may provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

In addition, computing system 600 may contain peripherals controller 635 responsible for communicating instructions from CPU 610 to peripherals, such as, printer 640, keyboard 645, mouse 650, and disk drive 655.

Display 665, which is controlled by display controller 663, is used to display visual output generated by computing system 600. Such visual output may include text, graphics, animated graphics, and video. Display 665 may be implemented with a CRT-based video display, an LCD-based flat-panel display, gas plasma-based flat-panel display, or a touch-panel. Display controller 663 includes electronic components required to generate a video signal that is sent to display 665.

Further, computing system 600 may contain network adaptor 670 which may be used to connect computing system 600 to an external communication network 310. Communications network 310 may provide computer users with means of communicating and transferring software and information electronically. Additionally, communications network 310 may provide distributed processing, which involves several computers and the sharing of workloads or cooperative efforts in performing a task. It will be appreciated that the network connections shown are exemplary and other means of establishing a communications link between the computers may be used.

Illustrative Computer Network Environment for Invention

Figure 7:
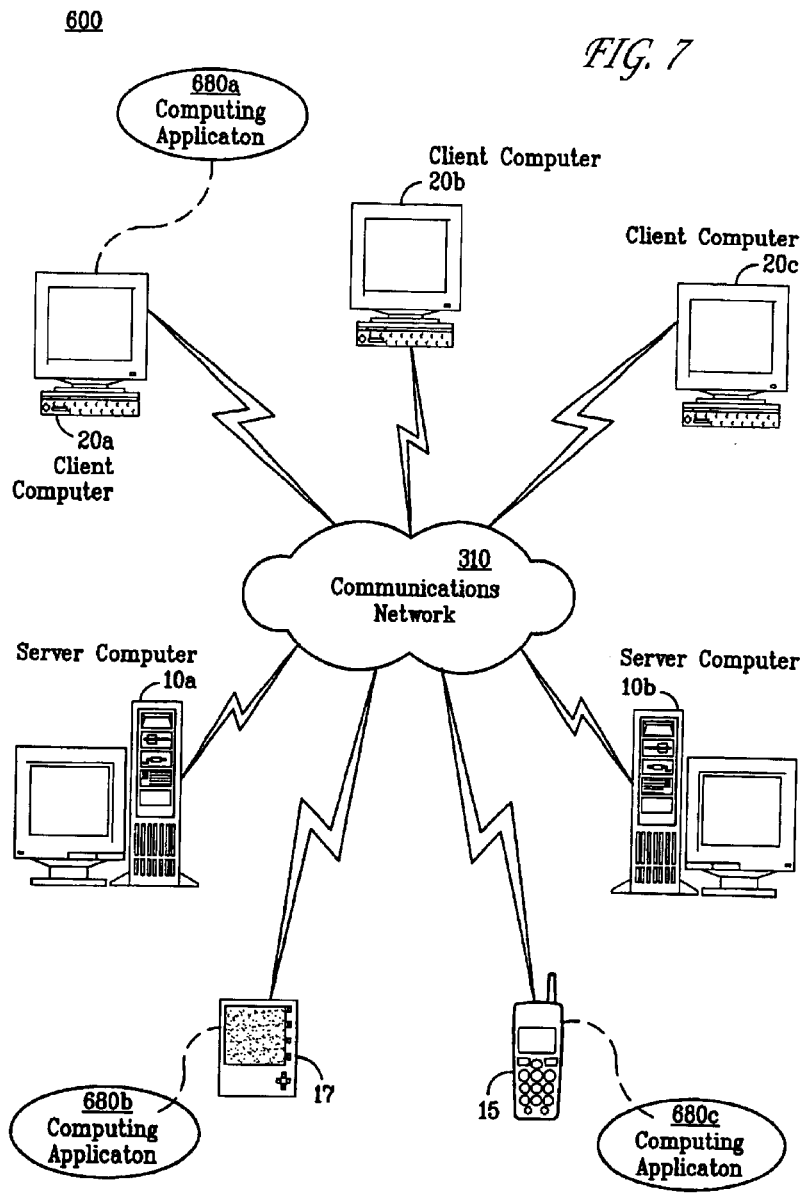
FIG. 7 illustrates an exemplary network environment in accordance with the invention.

As noted above, the computer described with respect to FIG. 6 can be deployed as part of a computer network. In general, the above description applies to both server computers and client computers deployed in a network environment. FIG. 7 illustrates an exemplary network environment, with a server computer 10a, 10b in communication with client computers 20a, 20b, 20c via a communications network 310, in which the present invention may be employed.

As shown in FIG. 7, a number of servers 10a, 10b, etc., are interconnected via a communications network 310 (which may be a LAN, WAN, intranet or the Internet) with a number of client computers 20a, 20b, 20c, or computing devices, such as, mobile phone 15 and personal digital assistant 17. In a network environment in which communications network 310 is the Internet, for example, servers 10 can be Web servers with which clients 20 communicate via any of a number of known protocols, such as, hypertext transfer protocol (HTTP) or wireless application protocol (WAP), as well as other innovative communication protocols. Each client computer 20 can be equipped with computing application 680a to gain access to servers 10. Similarly, personal digital assistant 17 can be equipped with computing application 680b and mobile phone 15 can be equipped with computing application 680c to display and receive various data.

Thus, the present invention can be utilized in a computer network environment having client computing devices for accessing and interacting with the network and a server computer for interacting with client computers. However, the systems and methods for providing adaptable rendering of data of the present invention can be implemented with a variety of network-based architectures, and thus should not be limited to the example shown.

Thus, an invention directed to methods and systems for controlling and managing distributed power resources through a central control center connected by a telecommunications network are disclosed. Although the invention was described in the context of an illustrated aggregation of distributed resources, the invention is not limited to such a system, regardless of any specific description in the drawing or examples set forth herein. It will be understood that the invention is not limited to use of any of the particular components or devices herein. Further, the method disclosed in the invention can be used in a variety of other applications.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the spirit and scope of the invention as defined by the following claims.

What is claimed is:

1. A method for providing electrical power to a plurality of end-users of electricity, comprising:
   receiving data in a central control center from each of the plurality of end-users, the data representing a demand for electrical power from each of the plurality of end-users;
   determining a power output from each of a plurality of electric-power devices each capable of providing a maximum of approximately 10 megawatts of electrical power necessary to meet an aggregate of the demand for electrical power from each of the plurality of end-users based on the data from each of the plurality of end-users and operating characteristics of each of the plurality of electric-power devices, using only the central control center, to optimize the operation of at least one of the electric-power devices by at least one of: minimizing an operating expense of the at least one of the electric-power devices; maximizing a reliability of the at least one of the electric-power devices; minimizing a cost to produce electric power using the at least one of the electric-power devices; and maximizing an efficiency of the at least one of the electric-power devices; and
   sending commands from the central control center to each of the plurality of electric-power devices to cause the plurality of electric-power devices to generate a combined power output equal to at least the aggregate of the demand for electrical power from each of the plurality of end-users.

2. The method of claim 1, further comprising receiving operating data in the central control center from each of the plurality of electric-power devices, and determining a power output from each of the plurality of electric-power devices necessary to meet an aggregate of the demand for electrical power from each of the plurality of end-users based on the operating data.

3. The method of claim 1, wherein the plurality of electric-power devices are located in separate geographic locations.

4. The method of claim 1, wherein the plurality of electric-power devices comprise at least one of an emergency generator; a fuel cell; a photovoltaic cell; a reciprocating engine; a wind turbine; a microturbine; a battery; a super-conducting magnetic energy storage device; and a flywheel.

5. The method of claim 1, wherein the plurality of electric-power devices comprise at least one of an electric power generator and an electric storage unit.

6. A system for providing electrical power to a plurality of end-users of electricity, comprising:
   a communications network;
   a plurality of electric-power devices each capable of providing a maximum of approximately 10 megawatts of electrical power;
   a central control center in communication with the plurality of electric-power devices, wherein the central control center:
   receives data from each of the plurality of end-users by way of the communications system, the data representing a demand for electrical power from each of the plurality of end-users;
   exclusively determines a power output from each of the plurality of electric-power devices necessary to meet an aggregate of the demand for electrical power from each of the plurality of end-users based on the data from each of the plurality of end-users and operating characteristics of each of the plurality of electric-power devices, to optimize the operation of at least one of the electric-power devices by at least one of: minimizing an operating expense of the at least one of the electric-power devices; maximizing a reliability of the at least one of the electric-power devices; minimizing a cost to produce electric power using the at least one of the electric-power devices; and maximizing an efficiency of the at least one of the electric-power devices; and
   sends commands to the plurality of electric-power devices by way of the communications network, the commands causing the plurality of electric-power devices to generate a combined power output equal to at least the aggregate of the demand for electrical power from each of the plurality of end-users.

7. The system of claim 6, wherein the central control center further comprises:
   at least one input device for at least one of receiving the data representing a demand for electrical power from each of the plurality of end-users and receiving operating data from the plurality of electric-power devices; and
   a processor for exclusively determining the power output from each of the plurality of electric-power devices necessary to meet the aggregate of the demand for electrical power from each of the plurality of end-users based on the data from each of the plurality of end-users and operating characteristics of each of the plurality of electric-power devices.

8. The system of claim 7, wherein the processor includes computer-executable instructions for:

receiving the data from each of the plurality of end-users;

determining the power output from each of the plurality of electric-power devices necessary to meet the aggregate of the demand for electrical power from each of the plurality of end-users; and sending the commands causing the plurality of electric-power devices to generate a combined power output equal to at least the aggregate of the demand for electrical power from each of the plurality of end-users.

9. The system of claim 6, further comprising a plurality of controllers for controlling operation of the plurality of electric-power devices in response to the commands sent to the plurality of electric-power devices by way of the communications network, and a plurality of communications devices for receiving the commands from the communications network and relaying the commands to the plurality of controllers.

10. The method of claim 6, wherein the plurality of electric-power devices are located in separate geographic locations.

11. The method of claim 6, wherein the plurality of electric-power devices comprise at least one of an emergency generator; a fuel cell; a photovoltaic cell; a reciprocating engine; a wind turbine; a microturbine; a battery; a super-conducting magnetic energy storage device; and a flywheel.

12. The method of claim 6, wherein the plurality of electric-power devices comprise at least one of an electric power generator and an electric storage unit.

13. A computer-readable medium comprising computer-executable instructions for:

receiving data from each of a plurality of end-users of electrical power, the data representing a demand for electrical power from each of the plurality of end-users;

exclusively determining a power output from each of a plurality of electric-power devices having a maximum power-generating capacity of approximately 10 megawatts necessary to meet an aggregate of the demand for electrical power from each of the plurality of end-users based on the data from each of the plurality of end-users and operating characteristics of each of the plurality of electric-power devices, to optimize the operation of at least one of the electric-power devices by at least one of: minimizing an operating expense of the at least one of the electric-power devices; maximizing a reliability of the at least one of the electric-power devices; minimizing a cost to produce electric power using the at least one of the electric-power devices; and maximizing an efficiency of the at least one of the electric-power devices; and sending commands to the plurality of electric-power devices for causing the plurality of electric-power devices to generate a combined power output equal to at least the aggregate of the demand for electrical power from each of the plurality of end-users.

14. The computer-readable medium of claim 13, wherein exclusively determining a power output from each of a plurality of electric-power devices having a maximum power-generating capacity of approximately 10 megawatts necessary to meet an aggregate of the demand for electrical power from each of the plurality of end-users comprises determining an optimum power output from at least one of the electric-power devices.

* * * * *

UNITED STATES PATENT AND TRADEMARK OFFICE
CERTIFICATE OF CORRECTION

PATENT NO. : 6,882,904 B1
DATED : April 19, 2005
INVENTOR(S) : Edward M. Petrie et al.

It is certified that error appears in the above-identified patent and that said Letters Patent is hereby corrected as shown below:

Column 6,
Line 61, "premise 15" should read -- premise 115 --

Column 7,
Line 6, "generator 1113" should read -- generator 113 --

Column 11,
Line 34, "and 516, as previously discussed" should read -- and 526, as previously discussed --.
Line 38, "application 80a" should read -- application 680a --

Signed and Sealed this

Seventh Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,882,904 B1
DATED : April 19, 2005
INVENTOR(S) : Edward M. Petrie et al.

It is certified that error appears in the above-identified patent and that said Letters Patent is hereby corrected as shown below:

<u>Title page,</u>
Item [73], Assignee, "ABB Technology AG" should be -- ABB Research Ltd. --.

Signed and Sealed this

Thirteenth Day of December, 2005

JON W. DUDAS
*Director of the United States Patent and Trademark Office*